United States Patent [19]

Kitagawa

[11] Patent Number: 4,915,398
[45] Date of Patent: Apr. 10, 1990

[54] METALLIC GASKET FOR USE IN AN INTERNAL COMBUSTION ENGINE

[75] Inventor: Junichi Kitagawa, Utsunomiya, Japan

[73] Assignee: Honda Giken Kogyo Kabushiki Kaisha, Tokyo, Japan

[21] Appl. No.: 134,749

[22] Filed: Dec. 18, 1987

[30] Foreign Application Priority Data

Dec. 19, 1986 [JP] Japan .................... 61-301575

[51] Int. Cl.⁴ .............................. F16J 15/08
[52] U.S. Cl. ...................... 277/207 R; 277/234; 277/235 B; 277/236
[58] Field of Search ............ 277/213, 235 B, 236, 277/207 R, 234

[56] References Cited

U.S. PATENT DOCUMENTS 4,471,968  9/1984  Schlaupitz et al. ............ 277/235 B

FOREIGN PATENT DOCUMENTS

| 893598 | 9/1953 | Fed. Rep. of Germany ... 277/235 B |
| 1003523 | 2/1957 | Fed. Rep. of Germany ... 277/235 B |
| 1907682 | 8/1970 | Fed. Rep. of Germany ... 277/235 B |
| 3245383 | 6/1984 | Fed. Rep. of Germany ... 277/235 B |
| 810728 | 3/1937 | France ...................... 277/235 B |
| 59-97363 | 6/1984 | Japan . |
| 3465 | 1/1985 | Japan ........................ 277/235 B |
| 268267 | 8/1950 | Switzerland .............. 277/235 B |
| 2103308 | 2/1983 | United Kingdom ......... 277/235 B |
| 2115503 | 9/1983 | United Kingdom ......... 277/235 B |

Primary Examiner—Allan N. Shoap
Attorney, Agent, or Firm—Birch, Stewart, Kolasch & Birch

[57] ABSTRACT

A metallic gasket to be interposed between a cylinder block and a cylinder head of an internal combustion engine. On this gasket is provided a embossment which surrounds an opening formed in this gasket along a smooth closed loop, and an inclination angle of an inner circumferential portion of the embossment is selected smaller than an inclination angle of an outer circumferential portion thereof. When the embossment is crushed by a fastening force generated by bolts, a deformation stress in the inner circumferential portion which is normally liable to become large, becomes nearly equal to a deformation stress in the outer circumferential portion, and accordingly, degradation of a sealing property and fatigue rupture caused by excessive deformation of the inner circumferential portion can be prevented.

7 Claims, 7 Drawing Sheets

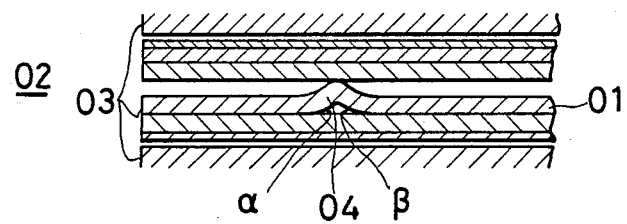
FIG. 1 PRIOR ART
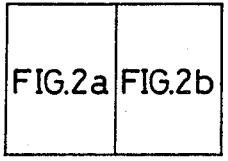
FIG. 2a
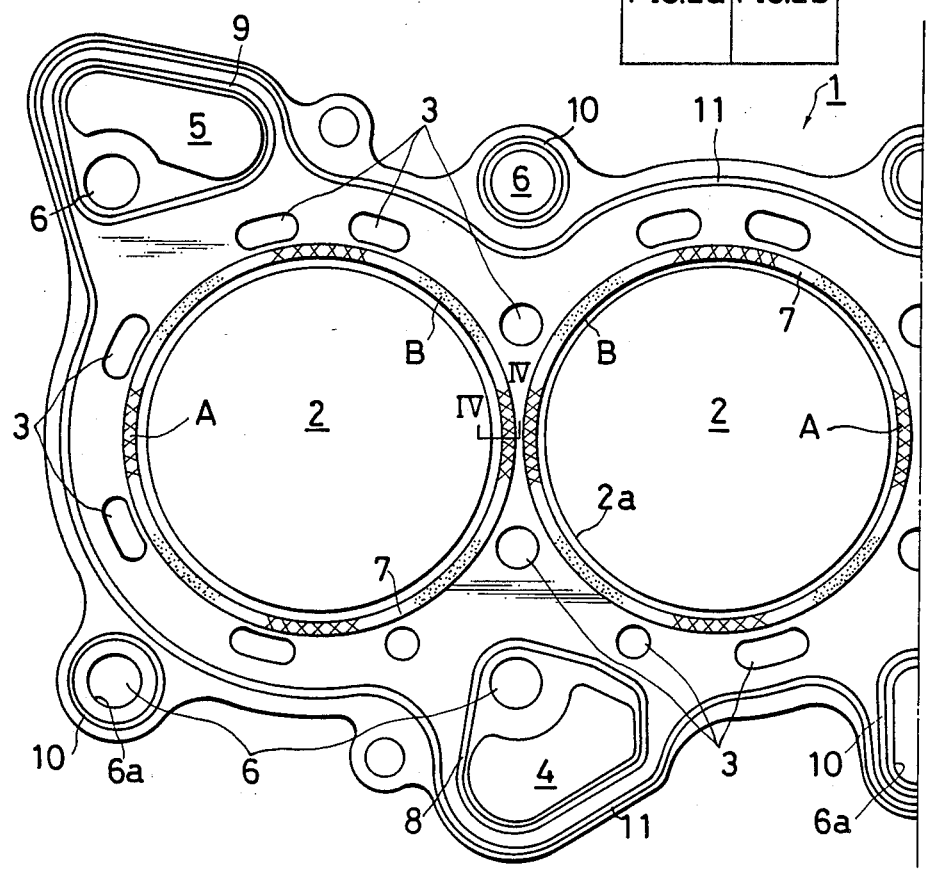

METALLIC GASKET FOR USE IN AN INTERNAL COMBUSTION ENGINE

BACKGROUND OF THE INVENTION

The present invention relates to a metallic gasket for use in an internal combustion engine, and more particularly to a metallic gasket to be interposed between a cylinder block and a cylinder head.

Between a cylinder block and a cylinder head of an internal combustion engine is interposed a gasket for the purpose of sealing a gap between joining surfaces of these members to maintain airtightness of a cylinder and also to prevent leakage of coolant water and engine oil. As shown in FIG. 1 (which corresponds to FIG. 2 of Laid-Open Japanese Patent Specification No. 59-97363 (1984)), in gasket 01 is formed an upwardly swelled portion (this is called "embossment" throughout this specification and claims) along an edge 03 of a gasket opening 02 corresponding to a cylinder bore of a cylinder block in order to deal with machining errors of joining surfaces of a cylinder block and a cylinder head and/or discrepancy in thermal expansion caused by uneven temperature distribution in the cylinder block and the cylinder head during operation of the engine.

The embossment 04 is subjected to compression load due to fastening forces of steel bolts for connection of the cylinder block and the cylinder head, and since this compression load would vary due to compression and explosion of intake gas and expansion of combustion gas which are quickly repeated within a cylinder bore, a large repetitive stress is generated in the embossment 04. Especially in the case where aluminium, aluminium alloy or like material is employed for a cylinder block and a cylinder head in order to realize a light weight engine, in the event that the internal combustion engine assumes a high power rotating condition or a high speed rotating condition and thus temperature rise of the engine body becomes substantial, a stress level of the above-mentioned repetitive stress would become high because a coefficient of thermal expansion of the above-mentioned material is larger than that of the steel bolts. Therefore, if the embossment 04 is made higher, a larger fastening force of the bolt is needed, causing the material of the gasket to be degraded compared with the customary gasket, and fatigue rupture of the embossment 04 is liable to occur.

A plan configuration of the embossment 04 takes a shape of a closed loop surrounding the gasket opening 02, for instance, a circular shape, and with respect to a cross-section configuration, in the prior art a rising angle $\alpha$ in an inner circumferential portion was equal to a rising angle $\beta$ in an outer circumferential portion, and a crest portion of the embossment was gently curved. In the event that an embossment 04 having the above-mentioned construction is subjected to compression load in the vertical directions as described above, a stress generated in the inner circumferential portion becomes larger than a stress generated in the outer circumferential portion, accordingly the shape of the inner circumferential portion is deformed, and a sealing property is degraded.

SUMMARY OF THE INVENTION

It is one object of the present invention to provide a metallic gasket for use in an internal combustion engine in which the above-mentioned difficulties are obviated.

According to the present invention, in a metallic gasket formed with a embossment along a smooth closed loop, the inclination angle of an inner circumferential portion of the embossment is selected to be smaller than the inclination angle of an outer circumferential portion. If the above-mentioned provision is made, a deformation stress generated in the inner circumferential portion of the embossment due to an external force tending to crush the embossment into a flat shape can be reduced to the same order as a deformation stress generated in the outer circumferential portion of the embossment.

BRIEF DESCRIPTION OF THE DRAWINGS

FIG. 1 is an enlarged partial cross-section view of a metallic gasket in the prior art;

FIG. 2 is a diagram showing the juxtaposition of FIGS. 2a and 2b;

FIG. 2a is a partial plan view showing one preferred embodiment of a metallic gasket for use in an internal combustion engine according to the present invention;

DETAILED DESCRIPTION OF THE PREFERRED EMBODIMENTS

Figure 2B:
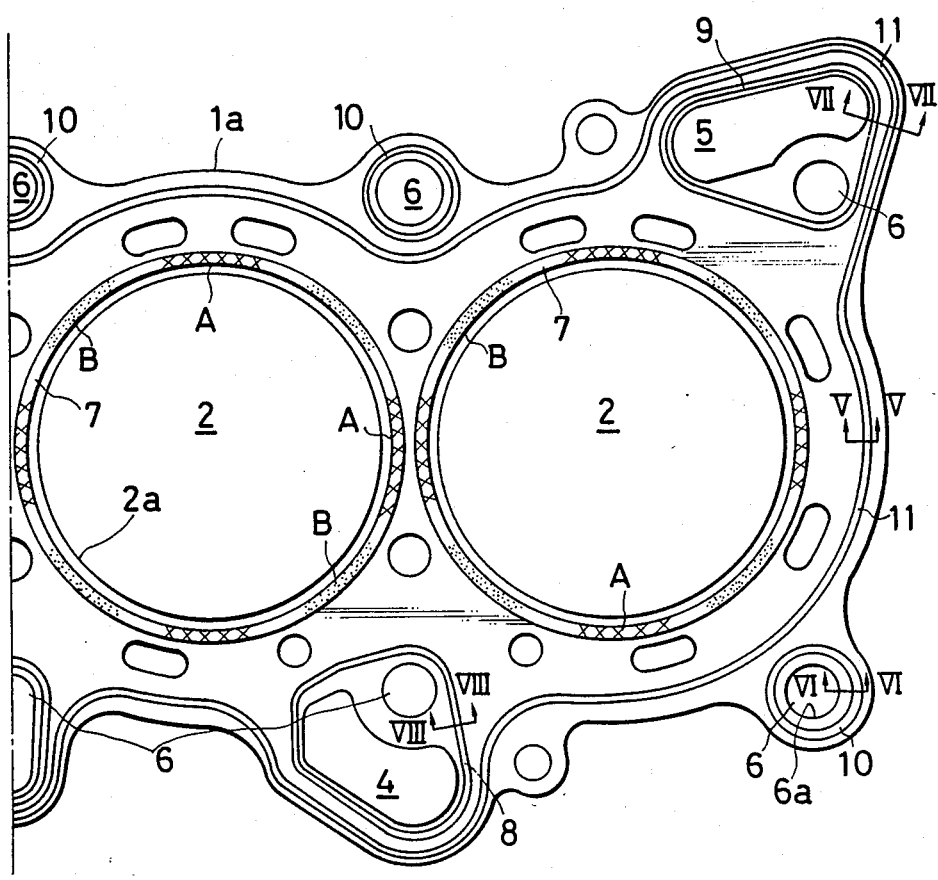
FIG. 2b is another partial plan view showing the metallic gasket.
Figure 3:
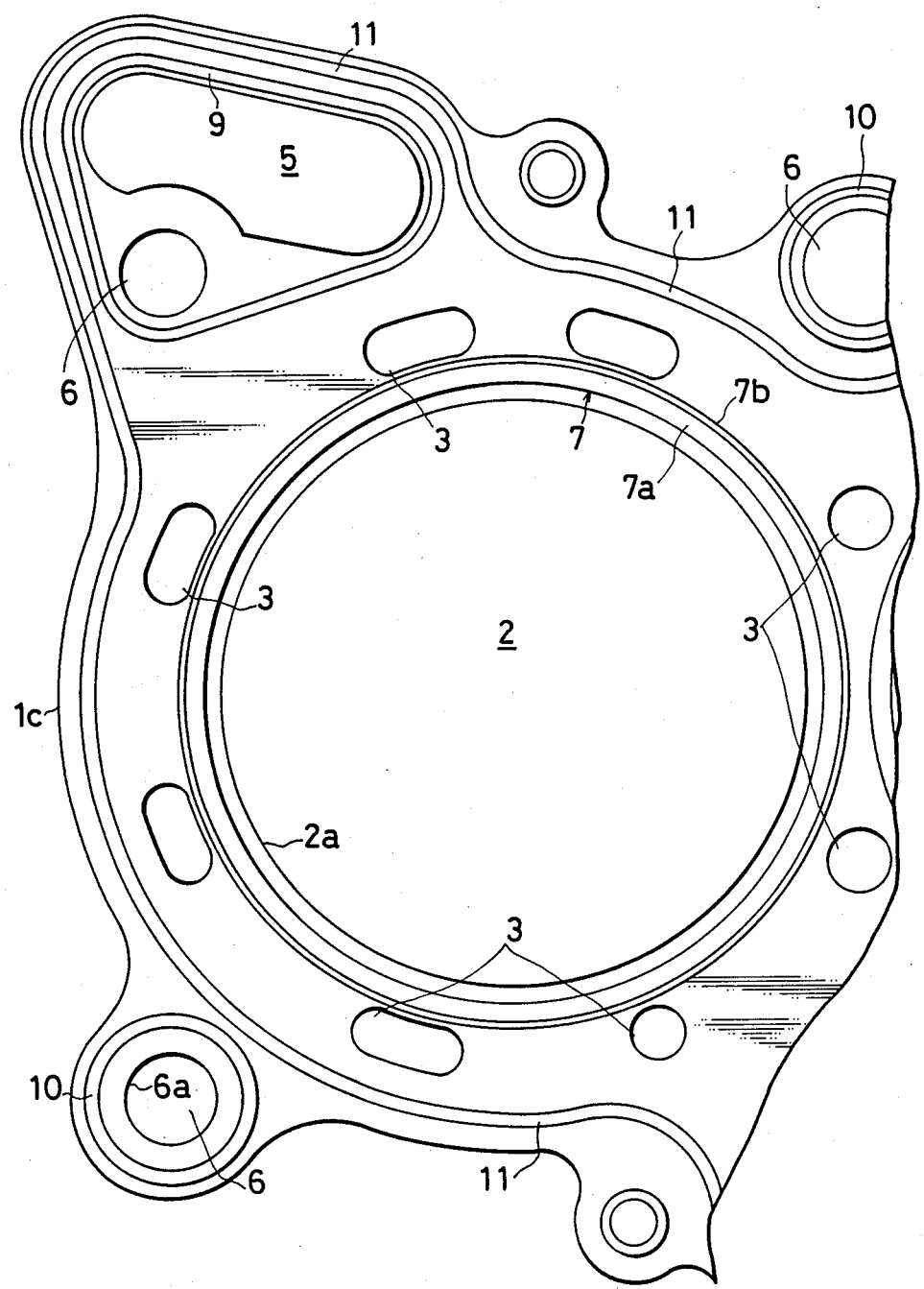
FIG. 3 is an enlarged partial plan view of the gasket.

In the following, description will be made on one preferred embodiment of the present invention illustrated in FIGS. 2 to 8.

A gasket 1 according to this preferred embodiment is made of stainless steel (JIS SUS 301) and has a sheet thickness of 0.25 mm, a length of about 38 cm and a width of about 17 cm, and it is adapted to be equipped between a cylinder block made of aluminium and a cylinder head made of aluminium, both not shown, and fastened by means of steel bolts, not shown. An outer edge 1c (FIG. 3) of the gasket 1 is formed in the same shape as outer edges of joining surfaces 12 and 13 (FIGS. 4 to 8) of the cylinder block and the cylinder head, respectively. The gasket 1 is provided with four cylinder openings 2 of 72 mm in diameter corresponding to the respective cylinder bores provided in the cylinder block and the cylinder head, and further, the gasket 1 is provided with coolant water openings 3, oil return openings 4, blow by openings 5 and bolt insert openings 6 which conform respectively to coolant water passageways, oil return passageways, blow by passageways and bolt insert bores penetrating through the cylinder block and the cylinder head.

About the respective cylinder openings 2 are formed embossments 7 so as to surround the respective openings 2, and about a number of bolt insert openings 6 are formed sloped steps 10 so as to individually surround the respective openings 6. About a bolt insert opening 6 adjacent to an oil return opening 4 is formed a sloped step 8 so as to surround the opening 6 and the opening 4 as a whole, and about a bolt insert opening 6 adjacent to a blow by opening 5 is formed a sloped step 9 so as to surround the opening 6 and the opening 5 as a whole. Furthermore, along the outer edge of the gasket 1 is formed a sloped step 11.

Figure 4:
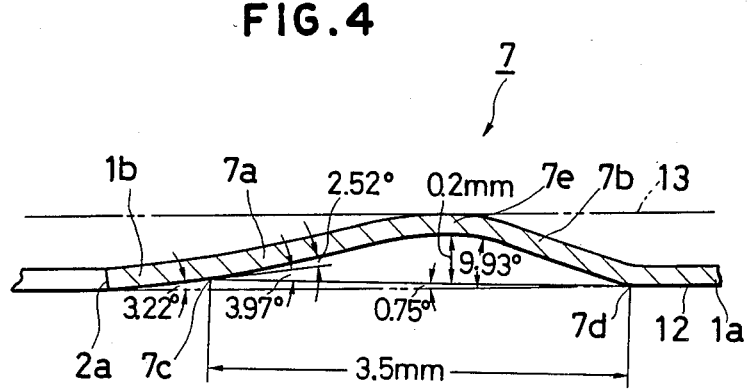
FIG. 4 is an enlarged cross-section view taken along line IV—IV, line in FIG. 2a, rising angles of an embossment being illustrated in an exaggerated scale.
Figure 5:
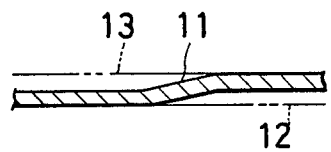
FIG. 5 is an enlarged cross-sectional view taken along line V—V in FIG. 2b.
Figure 6:
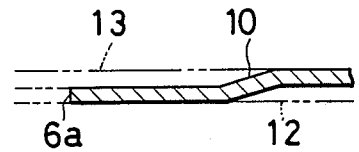
FIG. 6 is an enlarged cross-sectional view taken along line VI—VI in FIG. 2b.
Figure 7:
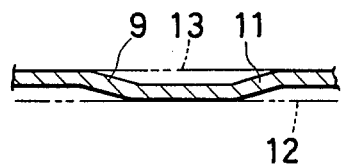
FIG. 7 is an enlarged cross-sectional view taken along line VII—VII in FIG. 2b.
Figure 8:
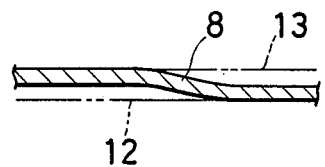
FIG. 8 is an enlarged cross-sectional view taken along line VIII—VIII in FIG. 2b.

The embossment 7 is formed as shown in transverse cross-section in FIG. 4. A width between an inner circumferential edge 7c and an outer circumferential edge 7d of the embossment 7 (this width being called "embossment width") is 3.5 mm, and a straight line connecting the outer circumferential edge 7d and the inner circumferential edge 7c is inclined upwards by 0.75° with respect to a main body portion 1a of the gasket 1. An opening edge portion 1b of the gasket 1 extending from the inner circumferential edge 7c of the embossment 7 to an edge 2a of the cylinder opening 2, is inclined downwards by 3.22° with respect to main body portion 1a of the gasket 1. The outer circumferential portion 7b of the embossment 7 inclines upwards to a crest portion 7e at an angle of 9.93° with respect to the main body portion 1a of the gasket 1, while the inner circumferential portion 7a of the embossment 7 inclines upwards to the crest portion at an angle of 2.52° with respect to the opening edge portion 1b of the gasket 1, or at an angle of 5.74° with respect to the main body portion 1a of the gasket. The crest portion 7e of the embossment 7 is bent smoothly with a large radius of curvature, and an embossment height corresponding to a length of a vertical line drawn from this crest portion 7e up to the straight line connecting the above-described outer circumferential edge 7d and inner circumferential edge 7c, is 0.2 mm.

The sloped steps 8, 9, 10 and 11 are formed to have inclined shapes as shown in FIGS. 5 to 8, respectively.

In an engine constructed with the gasket 1 in FIG. 2 installed between a cylinder block and a cylinder head both made of aluminium and connecting them by means of steel bolts, due to discrepancy between a coefficient of thermal expansion of the engine main body and a coefficient of thermal expansion of the steel bolts, fastening forces generated by the bolts are increased greatly upon operation of the engine, and a crushing force acting upon the embossment 7 as a result of these fastening forces is greatest in a portion B that is closest to the bolt, and is smallest in a portion A that is farthest from the bolt. Accordingly, the portion B of the embossment 7 that is strongly influenced by the fastening force of the bolt is kept crushed in a nearly flat shape, even when the fastening force of the bolt has been reduced as a result of temporary expansion of the bolt caused by compression and explosion of intake gas and expansion of combustion gas. On the other hand, the embossment in the portion A recovers its swelled shape due to reduction of a crushing force in the event that the fastening force of the bolt has been reduced in the above-described manner, and subsequently when the fastening force of the bolt is recovered and increased due to lowering of the pressure within the cylinder bore, it is again crushed into a nearly flat shape, and is liable to undergo fatigue rupture as it is subjected to large repetitive deformations. And this fatigue rupture is apt to occur in the inner circumferential portion of the embossment 7 as described previously.

However, in the preferred embodiment of the present invention illustrated in FIGS. 2 to 8, since an inner circumferential portion 7a adjacent to a cylinder opening edge 2a is inclined at a small angle as compared to an outer circumferential portion 7b of the embossment 7 as described above, a deformation stress generated in the inner circumferential portion 7a of the embossment 7 by the fastening force of the bolt, which stress is normally apt to become large, can be nearly equalized to a deformation stress generated in the outer circumferential portion 7b of the embossment 7. Accordingly, even in the portion A which is strongly affected by a repetitive crushing variable load applied to the embossment 7 as a result of operation of an engine, the embossment 7 is not likely to undergo fatigue rupture.

As a result of a fatigue test in which a compression force of 8000 kg was applied to the above-described gasket 1 made of stainless steel and a large variable load of sinusoidal waveform of 50 Hz and ±5,000 kg was applied $3 \times 10^6$ times, no crack was generated in the embossment 7.

In some cases, only the portion B of the embossment 7 may have the cross-section configuration as shown in FIG. 4 and other portions including the portion A of the embossment 7 may have the cross-section configuration as shown in FIG. 1.

Figure 9:
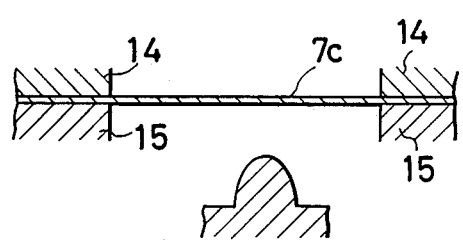
FIG. 9 is an schematic view illustrating a step in a manufacturing process for the metallic gasket according to the above-described embodiment.
Figure 10:
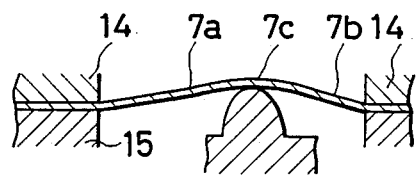
FIG. 10 is a schematic view illustrating another step in a manufacturing process for the metallic gasket.

In order to form the above-mentioned gasket 1 made of stainless steel, it is only necessary that a gasket 1 made of stainless steel is clamped between upper and lower press dies 14 and 15, and a punch die 16 is brought into contact with the location corresponding to the crest portion 7c of the embossment 7 and is pressed against the gasket 1, as shown in FIGS. 9 and 10.

Figure 11:
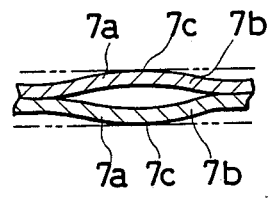
FIG. 11 is an enlarged partial cross-section view of embossment portions of a matallic gasket according to another preferred embodiment of the present invention.
Figure 12:
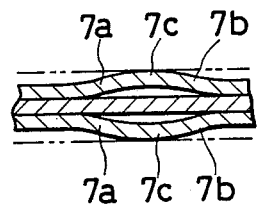
FIG. 12 is an enlarged partial cross-section view of embossment portions of a metallic gasket according to yet another preferred embodiment of the present invention.

The present invention may be applied to a double-layer gasket or more generally to a gasket consisting of an even number of layers in which embossments are formed symmetrically on the upper and lower sides as shown in FIG. 11, or else as shown in FIG. 12, it could be applied to a gasket consisting of an odd number of layers in which a flat gasket is disposed at the center and an even number of gasket layers deformed symmetrically are superposed thereon on the upper and lower sides in a symmetric manner.

Figure 13:
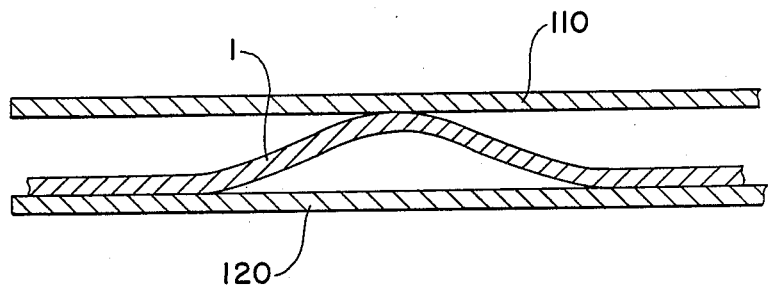
FIG. 13 is an enlarged partial cross section view of a metallic gasket.

Furthermore, in the preferred embodiment illustrated in FIG. 13, flat gaskets 110, 120 could be superposed on the upper and lower sides of the deformed gasket 1.

In addition, in place of the above-described sloped steps 8, 9, 10 and 11, embossments similar to the embossment 7 could be formed.

What is claimed is:

1. A metallic gasket for use in an internal combustion engine comprising:

an embossment formed in a main body of said metallic gasket along a smooth closed loop, said embossment having an opening edge portion, an inner circumferential portion substantially concentrically aligned with said opening edge portion and disposed toward an inside of the loop, and an outer circumferential portion adjoining said main body and substantially concentrically aligned with said inner circumferential portion and disposed toward an outside of the loop and a crest portion located between and joined to both the inner circumferential portion and the outer circumferential portion, characterized in that said inner circumferential portion is inclined toward said crest portion at a first angle and said outer circumferential portion is inclined toward said crest portion at a second angle, the first angle being smaller than the second angle and said opening edge portion is inclined with respect to said main body at a third angle, said third angle being smaller relative to said first angle.

2. A gasket as claimed in claim 1, in which said embossment is formed so as to surround an opening for a cylinder bore provided in the gasket.

3. A gasket as claimed in claim 1, in which a plurality of bolt insert openings are disposed around said gasket and said said inner circumferential portion forming said first angle is smaller than said outer circumferential portion forming said second angle only at positions near said bolt insert openings.

4. A gasket as claimed in claim 1, in which a plurality of gasket members are superposed on one another and said embossment is formed on at least one of said gasket members.

5. A gasket as claimed in claim 4, which consists of two layers of gasket members on which embossments are formed symmetrically on the upper and lower sides respectively.

6. A gasket as claimed in claim 4, in which one of said gasket members is a flat gasket member and gasket members each having said embossment are superposed on upper and lower sides of said flat gasket member.

7. A gasket as claimed in claim 4, in which flat gasket members are superposed on both sides of a gasket member having said embossment.

* * * * *